US008042674B2

(12) United States Patent
Hegerath et al.

(10) Patent No.: US 8,042,674 B2
(45) Date of Patent: Oct. 25, 2011

(54) CLUTCH ASSEMBLY WITH A LEG SPRING

(75) Inventors: Andreas Hegerath, Bergheim (DE);
Uwe Hinsberger, Köln (DE); Johann None Kirchhoffer, Köln (DE); Josef Fuss, Elsdorf (DE)

(73) Assignee: Getrag Ford Transmissions GmbH, Cologne, DE (US)

( * ) Notice: Subject to any disclaimer, the term of this patent is extended or adjusted under 35 U.S.C. 154(b) by 819 days.

(21) Appl. No.: 12/025,552

(22) Filed: Feb. 4, 2008

(65) Prior Publication Data
US 2008/0223682 A1 Sep. 18, 2008

(30) Foreign Application Priority Data

Feb. 5, 2007 (EP) ..................................... 07101702

(51) Int. Cl.
*F16D 3/12* (2006.01)
*F16D 3/10* (2006.01)
(52) U.S. Cl. .............................. 192/207; 464/73; 464/77
(58) Field of Classification Search .................. 192/55.3, 192/55.6, 207, 69.83; 464/77, 73, 74
See application file for complete search history.

(56) References Cited

U.S. PATENT DOCUMENTS

| | | | | |
|---|---|---|---|---|
| 1,714,105 A | * | 5/1929 | Ramsdell | 464/57 |
| 2,136,908 A | * | 11/1938 | Pierce et al. | 267/204 |
| 3,146,756 A | * | 9/1964 | Shimanckas | 464/57 |
| 3,706,465 A | | 12/1972 | Olowinski | |
| 4,623,322 A | * | 11/1986 | Melchior | 464/160 |
| 4,795,403 A | * | 1/1989 | Heine et al. | 464/77 |
| 4,944,278 A | * | 7/1990 | Woodard | 464/77 |
| 4,953,517 A | * | 9/1990 | McGovern et al. | 464/77 |
| 5,389,040 A | * | 2/1995 | Kakimi | 464/57 |
| 7,681,559 B2 | * | 3/2010 | Pratley et al. | 464/77 |
| 2003/0176222 A1 | * | 9/2003 | Zimmermann et al. | 464/73 |

FOREIGN PATENT DOCUMENTS

| | | |
|---|---|---|
| DE | 22 47 460 | 4/1973 |
| DE | 35 46 961 | 4/1986 |
| EP | 0 607 718 | 7/1994 |
| GB | 548 189 | 9/1942 |

* cited by examiner

*Primary Examiner* — Rodney Bonck
(74) *Attorney, Agent, or Firm* — Schlee IP International, P.C.; Alexander R. Schlee

(57) ABSTRACT

A clutch device is described comprising a first clutch element, a second clutch element that is disposed in a coaxial manner in relation to the first clutch element, a first engagement means, a second engagement provided for engaging with the first engagement in a positively interlocking manner for transmitting a torque between the first clutch element and the second clutch element, and a spring biasing the first engagement element and the second engagement element in a circumferential direction against each other. The spring comprises a leg spring with a ring part and two legs, wherein the ring part is disposed in a substantially coaxial relation to the first and second clutch parts and the legs extend in a radially outward direction.

15 Claims, 6 Drawing Sheets

CLUTCH ASSEMBLY WITH A LEG SPRING

This application claims the priority right from the European patent application EP 07101702.4 that was filed on Feb. 5, 2007 and published under the publication number EP 1 953 404 A1, the content of which is herewith incorporated in its entirety by reference.

This application claims the priority right from the European patent application EP 07101702.4 that was filed on Feb. 5, 2007 the content of which is herewith incorporated in its entirety by reference.

BACKGROUND OF THE INVENTION

The invention relates to a clutch device comprising a first clutch element, a second clutch element that is disposed in a coaxial manner in relation to the first clutch element, a first engagement means, a second engagement means provided for engaging with the first engagement means in a positively interlocking manner for transmitting a torque between the first clutch element and the second clutch element, and a spring means biasing the first engagement means and the second engagement means in a circumferential direction against each other.

Such a clutch device is for instance used in motor vehicles for connecting the combustion engine with the transmission of the motor vehicle. It is common that such clutch elements comprise a plurality of engagement elements as for instance claws of a claw coupling or in the form of teeth of splined connection. By means of the spring means biasing the clutch elements in a circumferential direction with respect to each other, undesired noise should be avoided that can otherwise be created by the oscillation excitement from the combustion engine and the clutch device (for example a clacking noise resulting from the back and forth movement within the range of play between the teeth). At the same time, the clutch device needs to allow an axial shifting for minimizing axial forces in direction of the motor and the transmission.

For example, from the German patent application DE 19623287 A1 a clutch is known wherein the first engagement element in the form of a projection comprises a gap separating this projection from a projection part that is formed as a stiff part and at least one projection element having predetermined elastic properties. This projection engages with a complementary depression forming the second engagement element of the clutch element, wherein the elastic projection and the depression are biased with respect to each other in circumferential direction. Since the available space for the connection between a motor and a transmission in a motor vehicle is a very limited, this solution is not appropriate in view of the torque that is to be transmitted and in view of the keeping assembly simple.

SUMMARY OF THE INVENTION

It is an object of the invention to create a clutch device with a spring means that can in particular connect a motor and a transmission in a motor vehicle and can be accommodated in a very limited space, wherein the clutch device prevents noise caused by oscillations from the motor, is simple in the design, and is easy to assemble.

According to one aspect of the invention, the clutch device comprises a spring means comprising a leg spring with a ring part and two legs, wherein the ring part is disposed in a substantially coaxial relation to the first and second clutch parts and the legs extend in a radially outward direction. In the alternative, the ring part can be disposed in an eccentric manner in relation to the clutch elements. One of the legs can be supported directly or indirectly at the first engagement means and the other leg can be directly or indirectly engaged with the second engagement means, so that the force of the leg spring presses the first engagement means in a circumferential direction against the second engagement means. The leg spring provides that the engagement means are not separated during the operation of the clutch device from each other and then subsequently abut against each other again since this would result in undesired noise (clacking) and would damage the clutch device.

The ring part of the leg spring can comprise a ring that is not closed in its circumferential direction and therefore comprises two open ends. Each one of the open ends is connected to one of the legs, respectively. The ring can be closed over an angle exceeding 300 degrees and preferably over an angle exceeding 320 degrees. The legs that are connected to the ends can extend substantially in parallel to each other.

The cross section of the leg spring can have a rectangular shape or any other shape (round, oval, and polygonal). Preferably, the leg spring is formed integrally from spring steel. By means of such a leg spring a biasing torque of over 30 Nm and even well over 30 Nm (for instance 50 Nm) can be achieved, wherein no or very little extra space is needed for accommodating the leg spring in the clutch device.

According to a preferred embodiment, during normal operation the first clutch element transmits a torque in a main rotational direction to the second clutch element, wherein the spring means biases the first engagement means in said main rotational direction against the second engagement means so that the first engagement means is with a load side in contact with a load side of the second engagement means. This arrangement provides that during the torque transmission from the first clutch element to the second clutch element in the main rotational direction the leg spring is not subjected to load. If in contrast the torque transmission is reversed, that is torque is transmitted from the second clutch element to the first clutch element, the engagement means that are abutting against each other in case of normal operation are separated from each other when the transmitted torque is higher than the torque generated by the leg spring. For avoiding that the load side of the first engagement means is separated from the load side of the second engagement means, the leg spring should be dimensioned such that the torque generated by the leg spring is higher as the usual torque that is generated in case of a torque reversal.

In the alternative or in addition the first engagement means and/or the second engagement means can comprise a catch that limits the deformation path of the spring means in case of a torque direction reversal from the second to the first engagement means (reversing the torque transmission in comparison to the normal operation of the clutch). This catch can comprise several abutting positions allowing to restrict the spring deformation length and therefore the force to which the spring means is subjected, so that an overload or the solid length position of the spring are effectively avoided.

According to a preferred aspect of the invention the leg spring is fixed in axial direction in relation to the first and second clutch elements and a free end of one of the legs is chamfered, allowing to shift the two clutch elements easily in axial direction into each other. The leg spring can be pre-biased.

The first and the second engagement means can be provided within a grease or oil chamber. The grease or oil chamber provides as a main purpose reduced axial forces and secondly provides a certain buffer action buffering possible oscillations between the first and the second engagement means in a circumferential direction. Moreover, the grease or the oil can contribute to avoid an abrasive wear caused by a relative motion of the engagement means with respect to each other, or at least reduce it.

A grease or oil chamber can be provided with at least one air exit opening through which air can escape in case of increasing temperatures in the grease chamber.

A plurality of first engagement means and second engagement means can be provided that are preferably evenly distributed along the circumference. For example, the clutch device can be designed as a claw coupling wherein the first engagement means and the second engagement means are both designed as a claw. In this case, one claw of the first clutch means engages in a depression or recess between two neighboring claws of the second clutch element.

In case of a plurality of first and second engagement means, one of the engagement means from a group of first engagement means and/or one of the engagement means from a group of second engagement means are isolated from the of the torque flow between the first and the second clutch elements and are in connection with the leg spring in a substantially spring force only transmitting manner. This achieves that the specific engagement means that are in direct abutment with the leg spring transmit only a force from the leg spring and not the torque from the motor to the transmission. This is in particular advantageous if the engagement means due to limited space for the leg spring have to be designed smaller than the other engagement means and therefore are weaker than the remaining engagement means of the clutch device. This allows these particular engagement means to be designed for just transmitting the force from the leg spring and these are not in contact with neighboring engagement means of the respective other clutch element. The required play must be bigger than the play that is allowed for the catch as described above. Therefore, the undefined range for the total torque transmitting capacity of the clutch device is minimized.

The spring means can comprise at least one resilient additional element, preferably in the form of a cushion, that can be provided at a free-wheeling side of the second engagement means. The resilient additional element can have a progressive spring characteristic. It can be arranged in parallel connection or serial connection with respect to the leg spring. The additional element can be made from metal, elastomer or rubber.

For facilitating of the assembly, in particular for shifting the clutch elements in axial direction into each other, the cushion can be pre-biased by means of a cushion holder that is preferably supported at the second engagement means and therefore holds the cushion at the free-wheeling side.

The cushion can be compressed so that it can be held together with the second engagement means within a recess or depression between two neighboring first engagement means. For example, the cushion holder can be designed in such a manner that the cushions of several second engagement means are connected to each other and are therefore jointly biased.

According to another aspect of the invention, the first engagement means is a tooth of a radially inwardly extending internal toothing of the first clutch element; and the second engagement means is a tooth of a radially outwardly extending external toothing of the second clutch element. Therefore, the positively interlocking clutch device is designed as a splined connection that allows a relative motion in axial direction between the two clutch elements.

BRIEF DESCRIPTION OF THE DRAWINGS

In the following, the invention is described in more detail by referring to the drawings. In the drawings shows.

DETAILED DESCRIPTION OF THE DRAWINGS

Figure 1:
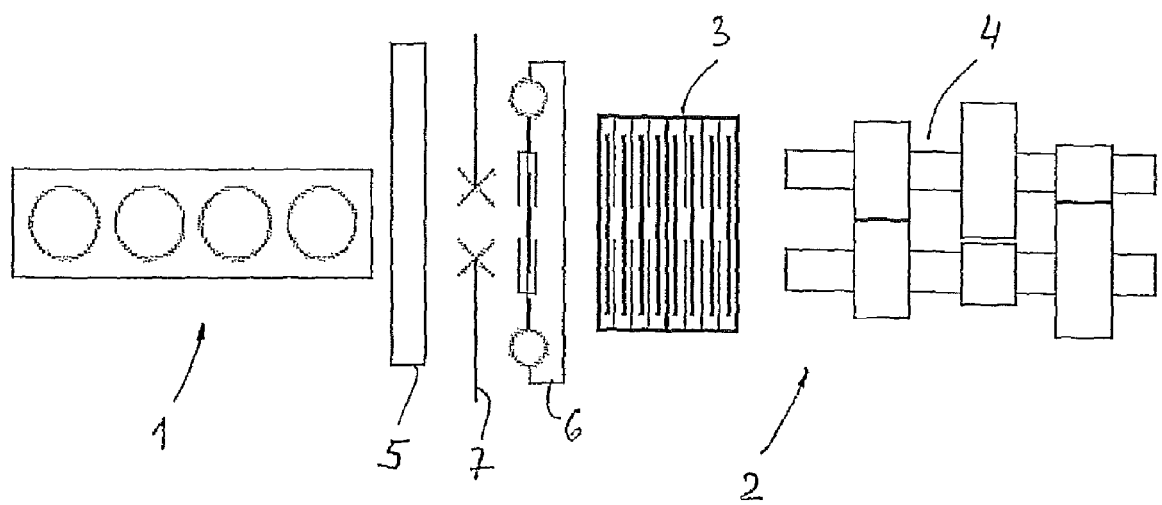
FIG. 1 a schematic view of a torque transmitting train between a combustion engine and a transmission.

FIG. 1 shows in a schematic manner a combustion engine 1 and the dual clutch transmission 2 of a motor vehicle. The dual clutch transmission 2 comprises a dual clutch 3 and a gear set 4. A flywheel 5 is screwed in a fixed manner to a crankshaft (not shown) of a combustion engine 1. Between the dual clutch 3 and the flywheel 5 a torsion buffer or oscillation buffer 6 is provided in that, by means of a form-fit or positively interlocking clutch device 7, is in a rotationally fixed manner connected with the flywheel 5. The clutch device 7 can for instance be a spline shaft connection or a claw coupling. Both the spline shaft connection, as well as the claw coupling, allow a relative motion of the crankshaft and the flywheel 5 in relation to the oscillation buffer 6 or the dual clutch 3, so that possible axial movements of the crankshaft are not transmitted into the transmission 2.

Figure 2:
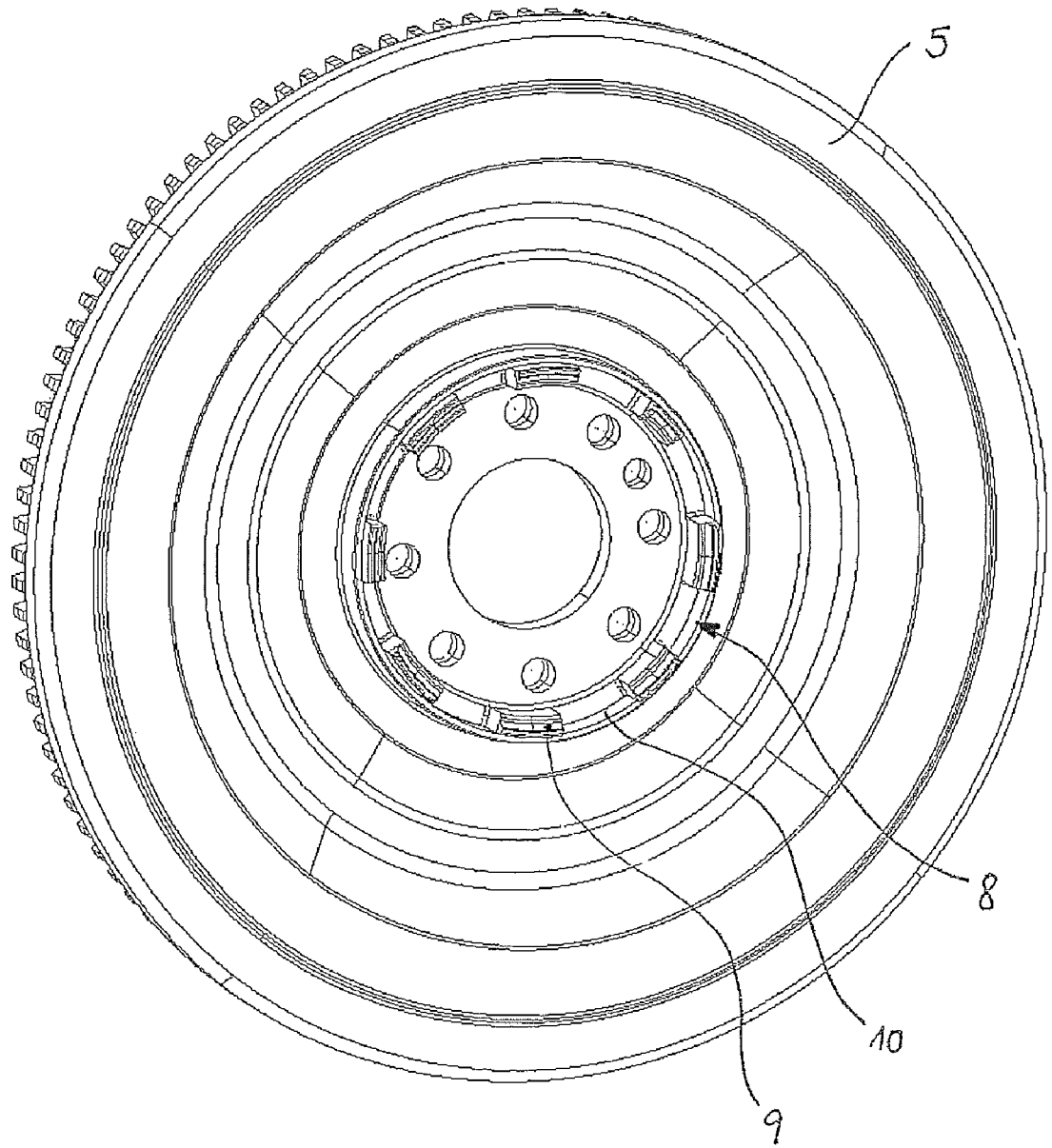
FIG. 2 a perspective view of a flywheel with a first clutch element.

FIG. 2 shows a perspective view of an embodiment of the flywheel 5. In a torque proof or torsionally stiff manner, the flywheel 5 is connected with the first clutch element 8 of the clutch device 7. The first clutch element 8 is designed in a substantially rotationally symmetric manner and comprises eight claws 9 that are in an evenly spaced manner distributed along the circumference of the first clutch element. Claws 9 protrude in an axial direction of the flywheel 5.

Figure 3:
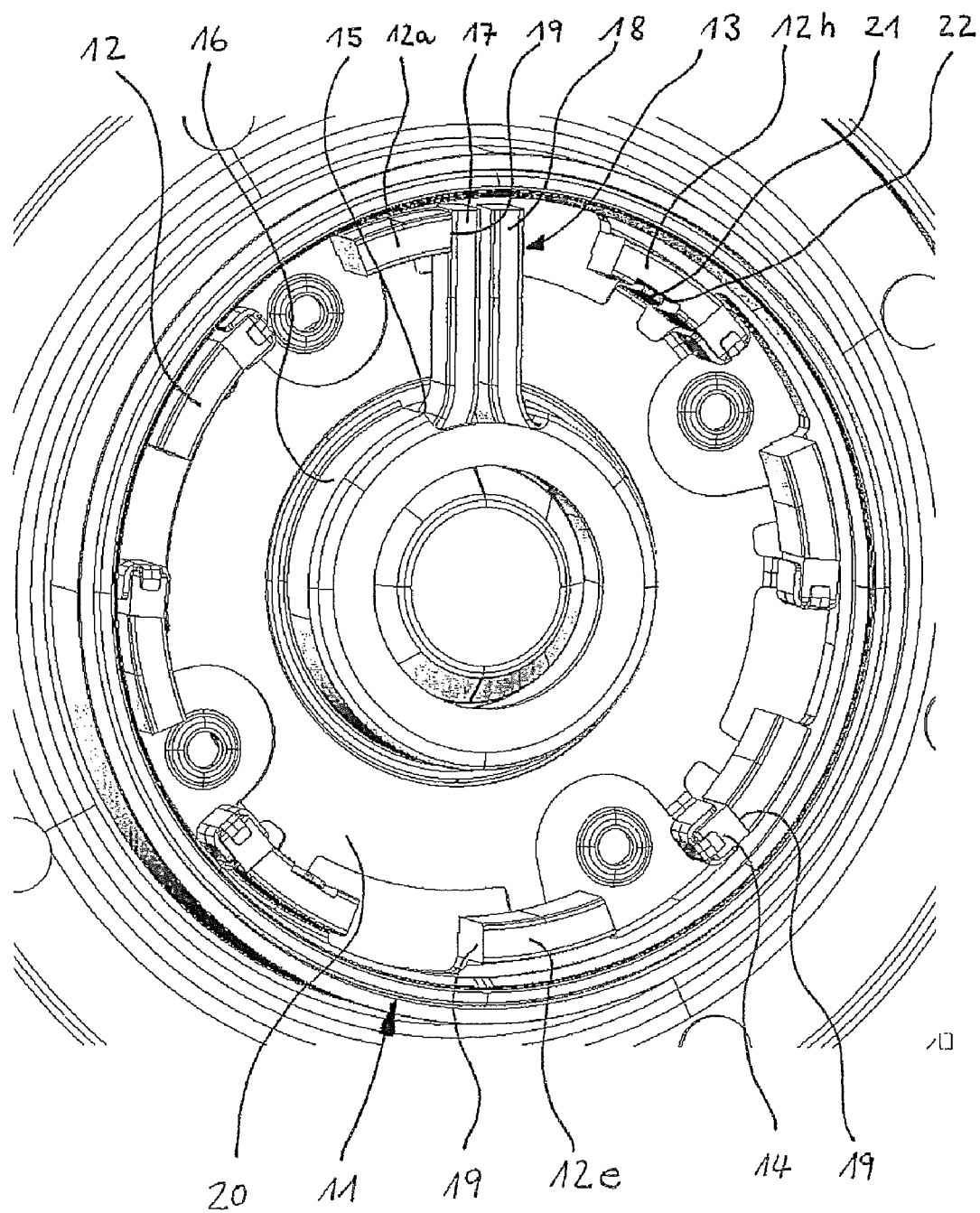
FIG. 3 a perspective view of the second clutch element.

Between the two neighboring claws 9 a recess or depression 10 is provided into that, when the clutch device 7 is in its finally assembled position, claws 12 of a second clutch element 11 interlock that is shown according to one embodiment in FIG. 3. The second clutch element 11 is in a rotationally fixed manner connected to the oscillation buffer 6. The claws 12 are likewise evenly distributed in a spaced manner at the outer circumference of the second clutch element and are built in a complementary fashion, complementing with the claws 9 of the first clutch element. This means that a claw 12 of the second clutch element 11 is provided in the recess 10 between two neighboring claws 9 of the first clutch element. This results in a form-fitted or positively interlocking connection between the first and second clutch elements 8 and 11.

Further, the second clutch element 11 comprises a spring means comprising eight leg spring 13 and a plurality of resilient additional elements in the form of elastically deformable cushions 14.

The leg spring 13 comprises a ring 15 that is kept in a ring-shaped housing 16. Further, the leg spring 13 comprises two legs 17, 18 that extend in radial direction. Against a spring force from the leg spring 13 the two legs 17, 18 can be pressed towards each other until these abut against each other.

In total, the spring means of the second clutch element 11 comprises six cushions 14 that are provided at a free-wheeling side 19 of the claws 12 of the second clutch element 11. Two claws 12a and 12e do not comprise cushions 14 at their respective free-wheeling sides 19.

The six cushions 14 are connected to each other by means of a mutual cushion holder. The cushion holder 20 is manufactured as a pressed part and functions to hold the elastically deformable cushions 14 in their position or bias them. For this purpose, the cushion holder 20 comprises angled webs 21 engaging a recess 22 of claw 12 (see claw 12h) and abut with their ends at their sides with the recess 22 in circumferential direction.

Figure 4:
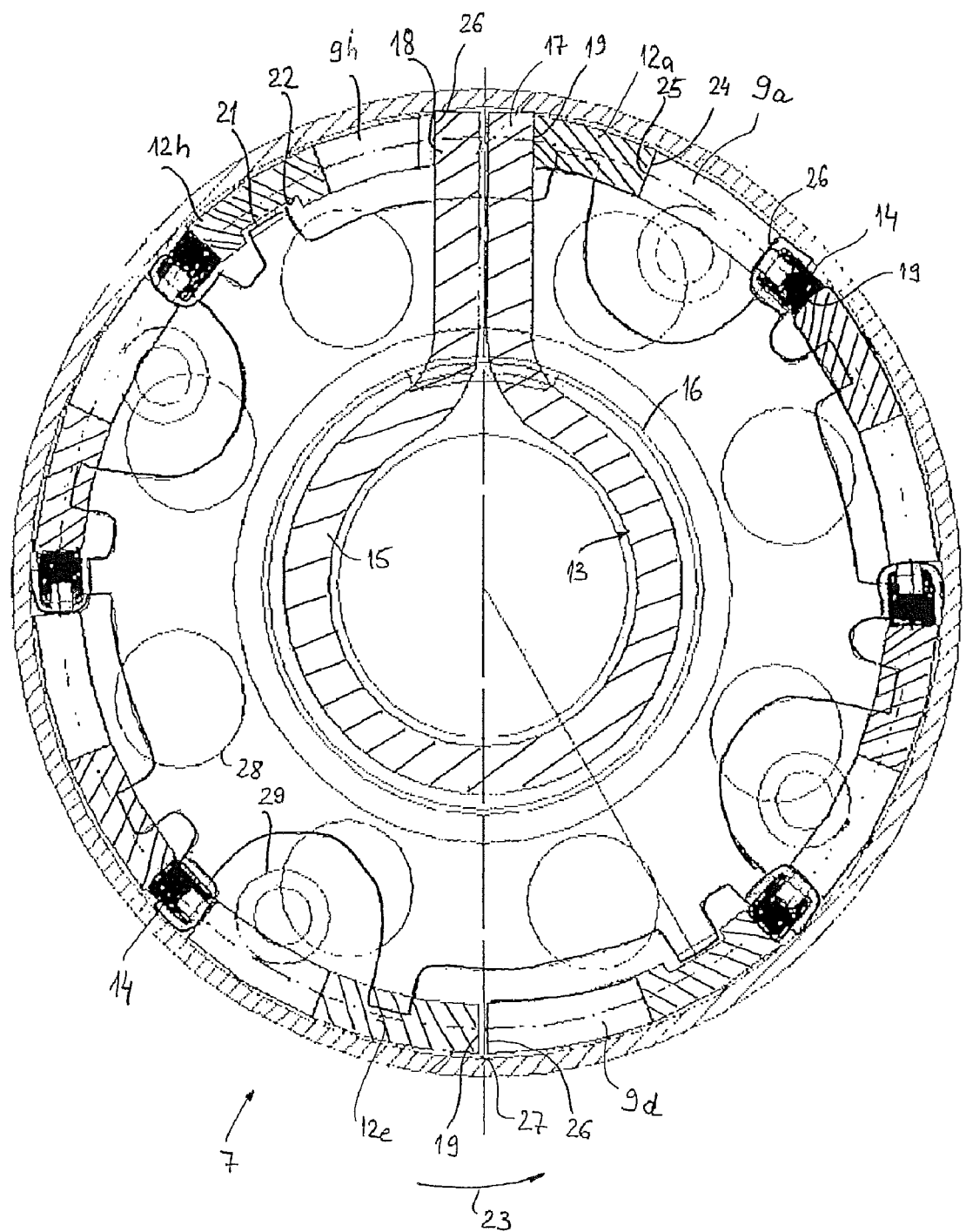
FIG. 4 the first and second clutch elements together.

FIG. 4 shows how the claws 12 of the second clutch element 11 and the claws 9 of the first clutch element interact with each other, wherein the view is from the side of the oscillation buffer 6. Accordingly, since the perspective now differs from the perspective shown in FIG. 3, the second clutch element is viewed from the side of the combustion engine 1 or the flywheel 5, resulting in that the parts shown in FIG. 4 appear side-inverted in comparison to FIG. 3. For example, in FIG. 4 the claw 12a is now on the right side of the legs 17, 18 of the leg spring 13, while these are on the left side in FIG. 3.

In case of a normal driving action of the motor vehicle the torque is transmitted from the combustion engine 1 via the clutch device 7 into the dual clutch transmission 2. For the clutch device 7 this means that the claws 9 of the first clutch element transmit the respective torque to the claws 12 of the second clutch element. The rotational direction is demonstrated by the arrow carrying the reference numeral 23. As a result, the claws 9 are pressed with their side of load 24 against the directly abutting side of load 25 of the claws 12. At the free-wheeling side 19 that is located directly opposite of the side of load 25, as already discussed above, with exception of the claws 12a and 12e, the cushions 14 are disposed. At the free-wheeling face 19 of the claw 12a the leg 17 of the leg spring 13 abuts. The other leg 18 of the leg spring 13 abuts against the free-wheeling side 26 of the claws 9h. By means of the leg spring 13 the claw 12a and therefore also the remaining claws 12 are pressed against the respectively neighboring claws 9. This results in that the leg spring 13 presses the side of load 25 of the claws 12 against the corresponding sides of load 24 of the claws 9. For the torque flow during the normal driving this means that both the leg spring 13, as well as the cushion 14 are not subjected to the torque that is transmitted from the motor into the transmission.

If load is reversed, for example if the motor vehicle drives downhill and is decelerated by the motor, the claws 12 press with their free-wheeling side 19 against the free-wheeling side 26 of the respectively adjacent claw 9, wherein the cushions 14 as well as the leg spring 13 are subjected to the torque that is then transmitted from the transmission 2 into the motor 1. For protecting the cushions 14 and the leg spring 13 from an overload, the clutch device 7 comprises the free-wheeling stop or free-wheeling abutting element 27. In case of a reversed load, that is when the torque transmission takes place from the second clutch element into the first clutch element, the legs 17, 18 of the leg spring 13 as well as the cushions 14 are pressed together so that the gap between the claw 12e and the claw 9d, as shown in FIG. 4, is closed at the free-wheeling stop 27 so that the free-wheeling side 19 of the claw 12e abuts against the free-wheeling side 26 of the claw 9d. By means of this abutment of the claws 12e and 9d the leg spring 13 and the cushions 14 are protected from an overload.

For creating a space for the legs 17, 18, the claws 9h, 12a are designed a little short in the circumferential direction in comparison to the other claws and 9, 12. This can result in higher shearing tensions in the claws 9h, 12a, assuming that the torque to be transmitted by the clutch device 7 is evenly distributed over the eight claw pairs. For protecting the shorter and therefore less strong claws 9h, 12a from an overload, gaps can be provided between the claw 12a and the claw 9a and between the claw 9h and the claw 12h, respectively. This results in that the claws 9h, 12h no longer transmit the torque of the clutch, but only carry the force exerted by the leg spring and bias the two clutch parts in the circumferential direction against each other.

Screws 28 are provided for fixing the first clutch element 8 in a torque proof manner at the flywheel 5. Corresponding screws for attaching the clutch element 11 at the oscillation buffer 6 are denoted with reference numerals 29.

Figure 5:
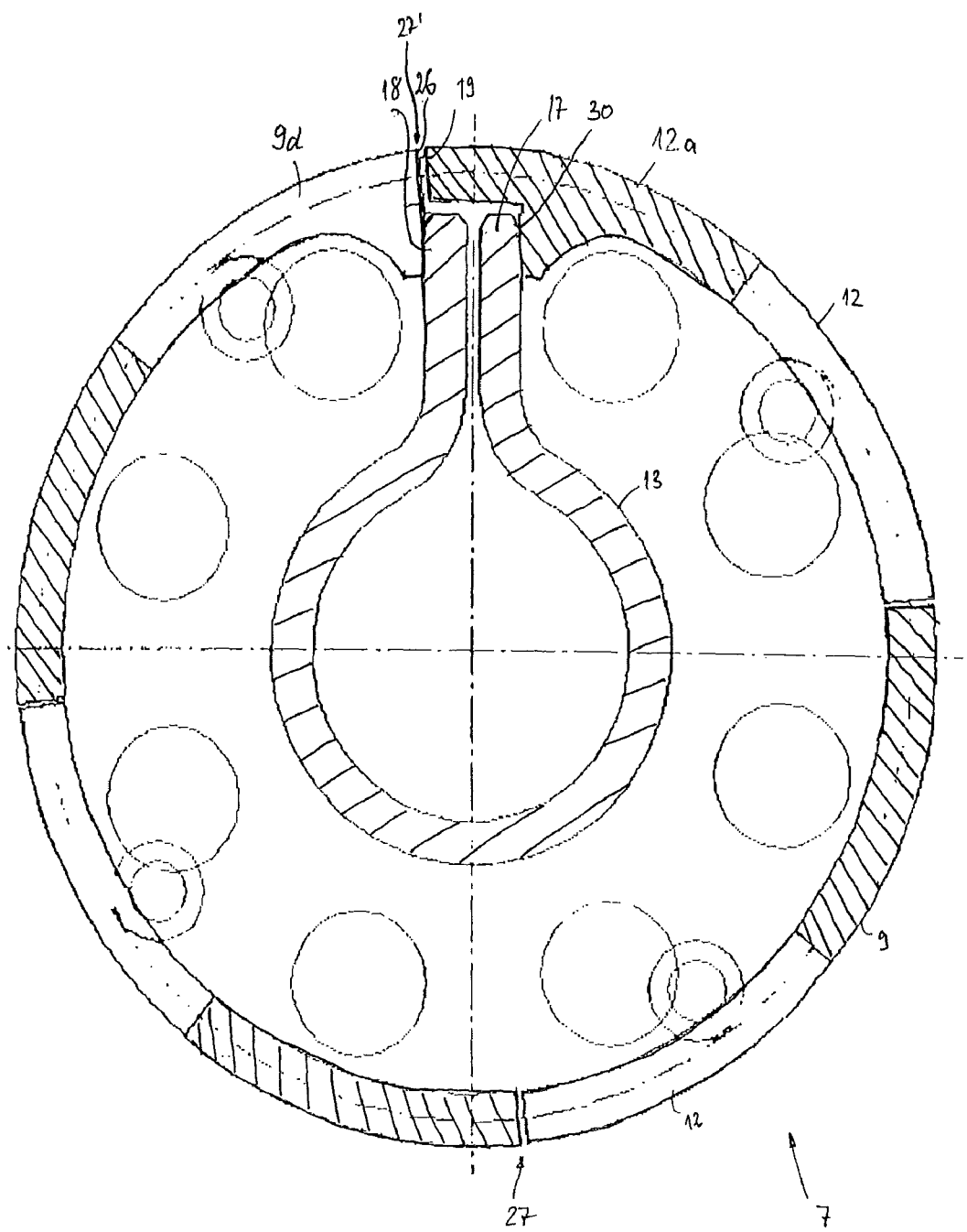
FIG. 5 a further embodiment of the first and second clutch element.

FIG. 5 shows a further embodiment of the clutch device 7. The embodiment of FIG. 7 distinguishes from the embodiment in FIG. 4 by the number of claws 9, 12. In this embodiment, the clutch elements 8, 11 both only comprise four claws 9, 12. Furthermore, between two adjacent free-wheeling sides 19, 26 of neighboring claws 9, 12 no cushions are provided. This means that the claws 9, 12 are pressed with their load side 24, 25 only by means of the biasing force of the leg spring 13 against each other. A further distinction between the embodiments shown in FIGS. 5 and 4 is that the leg spring 17 does not abut against the free-wheeling side 19 of the claw 9a, but against the separate abutting face 30. Between the free-wheeling side 26 of the claw 9d of the first clutch element and the claw 12a a small gap is provided that closes when the load is reversed, i.e. the torque is transmitted from the transmission into the motor, causing that the two legs 17, 18 are pressed against the force from the leg spring 13 against each other. Therefore, the embodiment shown in FIG. 5 shows a free-wheeling stop 27' that is provided at about 180 degrees offset compared to the free-wheeling stop 27 according to the embodiment shown in FIG. 4. The legs 17, 18 of the leg spring 13 of the embodiment according to FIG. 5 are therefore not extending to the outer circumference of the claws 9, 12, but only up to the inner circumference of the claws 9, 12. For providing a sufficiently large abutment face for the leg 18, the free-wheeling face of the claw 9d extends in radial direction to the inside.

Figure 6:
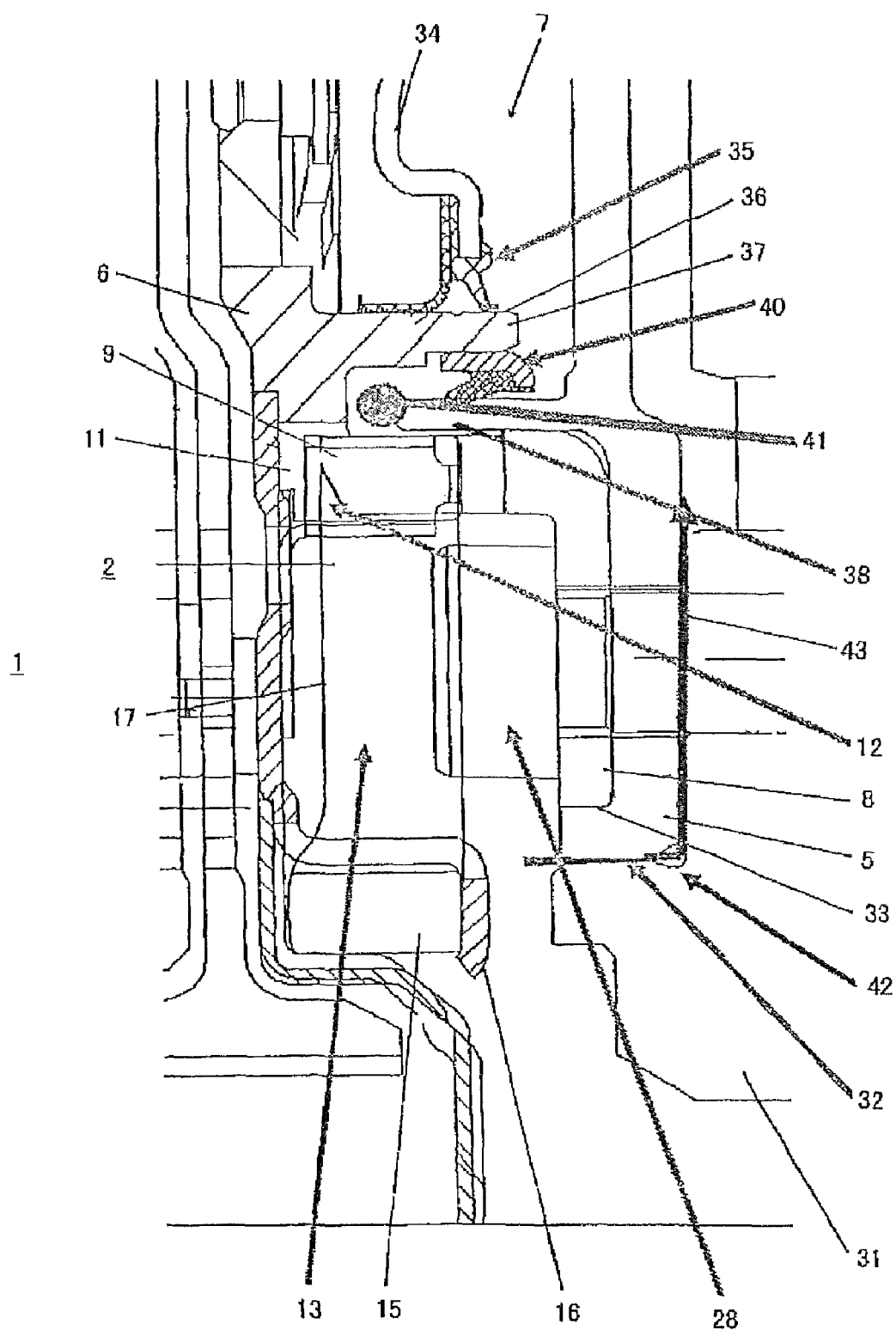
FIG. 6 a longitudinal sectional view of an embodiment.

FIG. 6 shows an embodiment of the clutch device 7 as a sectional view in a longitudinal direction. In FIG. 6 the motor 1 (substantially not shown) is provided on the right side and connected in a fixed manner with the flywheel 5. A crankshaft 31 of the motor 1 comprises a shoulder 32 provided for accommodating the flywheel 5. By means of the shoulder 32 a center fit of the flywheel 5 on the crankshaft 31 is provided. The flywheel 5 itself has a shoulder 33 for accommodating the first clutch element 8 that provides that also said clutch element is aligned coaxially in relation to the crankshaft 31. By means of a screw 28 the crankshaft 31, flywheel 5 and the first clutch element 8 are connected to each other both in axial as well as in circumferential direction. Since the flywheel 5 and the first clutch element 8 are separate parts, these two parts can also be manufactured independently from each other so that heat treatment for tempering can be restricted to the first clutch element 8.

On the left side of FIG. 6 the (non-shown) dual clutch transmission 2 is provided adjacent to the clutch device 7, the oscillation or torsion buffer 6 being flanged to the dual clutch transmission. The buffer accommodates the second clutch element 11, the claws 12 of which are engaged by the claws 9 of the first clutch element 8. The leg spring 13 can be seen, the ring 15 of which being provided in the ring-shaped spring housing 16. From the ring 15 the leg 17 extends in the radially outward direction.

Between the torsion buffer 6 and a buffer cup 34, only a small part of which is shown, an outer buffer seal 35 is provided that is in contact with the outer casing surface 36 of a cylindrical collar 37 of the torsion buffer 6. The cylindrical collar 37 encloses the cylindrical collar 38 that is integrally formed with the flywheel 5, wherein a lip seal 40 is pressed into an inner casing surface 39 of the collar 37 that seals a gap between the collars 37, 38 when these are inserted into each other.

By means of the lip seal 40 a ring-shaped grease chamber 41 is sealed, accommodating the claws 9, 11 and the leg spring 13. By means of the grease and oil provided in the grease chamber 41 abrasive wear of the claws 9, 11 is minimized, resulting in that the acoustic properties of the clutch device do not deteriorate even over a long life span.

By means of small bores 42, preferably between the crankshaft 31 and the flywheel 5, air can escape from the grease chamber 41 in case of a rise in temperature resulting in high pressure. An air exit path 43 is demonstrated in FIG. 6 with a bold arrow.

In the following, the elements in the drawings are listed with their respective reference numerals:
1 combustion engine
2 dual clutch transmission
3 dual clutch
4 gear set
5 flywheel
6 oscillation/torsion buffer
7 clutch device
8 first clutch element
9 claws
10 recess
11 second clutch element
12 claw
13 leg spring
14 cushion
15 ring
16 spring housing
17 leg
18 leg
19 free-wheeling side
20 cushion holder
21 web
22 recess
23 direction of rotation
24 side of load
25 side of load
26 free-wheeling side
27 free-wheeling stop
28 screw
29 screw
30 abutting face
31 crankshaft
32 shoulder
33 shoulder
34 buffer cup
35 outer buffer seal
36 outer casing surface
37 collar
38 collar
39 inner casing surface
40 lip seal
41 grease chamber
42 bore
43 air exit path

The invention claimed is:

1. A clutch device comprising:
a first clutch element
a second clutch element that is disposed in a coaxial manner in relation to the first clutch element;
a first engagement element;
a second engagement element provided for engaging with the first engagement element in a positively interlocking manner for transmitting a torque between the first clutch element and the second clutch element; and
a spring biasing the first engagement element and the second engagement element in a circumferential direction against each other; wherein
the clutch device is designed for connecting a motor vehicle engine with a transmission of the motor vehicle;
the spring comprises a leg spring with a ring part and two legs, the ring part is not closed in the circumferential direction and therefore comprises two open ends, one of the two open ends is connected to one of the legs, and the ring part is disposed in a substantially coaxial relation to the first and second clutch elements and the legs extend in a radially outward direction; and
the first clutch element transmits during normal operation a torque in a main rotational direction to the second clutch element, wherein the spring biases the first engagement element in said main rotational direction against the second engagement element so that the first engagement element is with a load side in contact with a load side of the second engagement element.

2. The clutch device as claimed in claim 1, wherein the ring is closed over an angle exceeding 300 degrees and the legs extend substantially in parallel.

3. The clutch device as claimed in claim 2, wherein the ring is closed over an angle exceeding 320 degrees.

4. The clutch device as claimed in claim 1, wherein the leg spring has a rectangular cross section.

5. The clutch device as claimed in claim 1, wherein the first engagement element and the second engagement element form a free-wheeling-stop restricting a spring deformation range of the spring for protecting said spring.

6. The clutch device as claimed in claim 1, wherein the leg spring is fixed in axial direction in relation to the first and second clutch elements and a free end of one of the legs is chamfered, allowing to shift the two clutch elements in axial direction into each other.

7. The clutch device as claimed in claim 1, wherein the first engagement element and the second engagement element are provided within a grease or oil chamber.

8. The clutch device as claimed in claim 7, wherein the grease or oil chamber comprises an air exit opening.

9. The clutch device as claimed in claim 1, wherein a plurality of first and second engagement elements are provided.

10. The clutch device as claimed in claim 9, wherein one of the engagement elements from the plurality of first engagement elements or one of the engagement elements from the plurality of second engagement element are separated from a torque transmission path transmitting torque between the first and the second clutch elements and are in connection with the leg spring in a spring force transmitting manner.

11. The clutch device as claimed in claim 9, wherein one of the engagement elements from the plurality of first engagement elements and one of the engagement elements from the plurality of second engagement elements are separated from a torque transmission path transmitting torque between the first and the second clutch elements and are in connection with the leg spring in a spring force transmitting manner.

12. The clutch device as claimed in claim 1, wherein the first engagement element and the second engagement element both are designed as claws.

13. The clutch device as claimed in claim 1, wherein the spring comprises a resilient additional element that is provided at a free-wheeling side of the second engagement element.

14. The clutch device as claimed in claim 13, wherein the resilient additional element is a cushion.

15. The clutch device as claimed in claim 14, wherein the cushion is biased by means of a cushion holder, wherein the cushion holder is supported by the second engagement element.

* * * * *

UNITED STATES PATENT AND TRADEMARK OFFICE
CERTIFICATE OF CORRECTION

PATENT NO. : 8,042,674 B2  
APPLICATION NO. : 12/025552  
DATED : October 25, 2011  
INVENTOR(S) : Andreas Hegerath et al.

Page 1 of 1

It is certified that error appears in the above-identified patent and that said Letters Patent is hereby corrected as shown below:

Col. 1, Line 3  
FIRST SECTION READS:

This application claims the priority right from the European patent application EP 07101702.4 that was filed on Feb. 5, 2007 and published under the publication number EP 1 953 404 A1, the content of which is herewith incorporated in its entirety by reference.

This application claims the priority right from the European patent application EP 07101702.4 that was filed on Feb. 5, 2007 the content of which is herewith incorporated in its entirety by reference.

BACKGROUND OF THE INVENTION:

SHOULD READ:

This application claims the priority right from the European patent application EP 07101702.4 that was filed on Feb. 5, 2007 and published under the publication number EP 1 953 404 A1, the content of which is herewith incorporated in its entirety by reference.

BACKGROUND OF THE INVENTION:

Signed and Sealed this  
Seventh Day of February, 2012

David J. Kappos  
*Director of the United States Patent and Trademark Office*